United States Patent
Zhu et al.

(10) Patent No.: US 11,144,942 B2
(45) Date of Patent: Oct. 12, 2021

(54) INFORMATION PROCESSING METHOD, SERVER, FIRST TERMINAL, AND COMPUTER STORAGE MEDIUM

(71) Applicant: Tencent Technology (Shenzhen) Company Limited, Shenzhen (CN)

(72) Inventors: Weifeng Zhu, Shenzhen (CN); Zhenyu Xu, Shenzhen (CN); Wa Ye, Shenzhen (CN); Jing Zang, Shenzhen (CN); Pingjin Xie, Shenzhen (CN); Zheng Wang, Shenzhen (CN); Jie Lin, Shenzhen (CN); Hongyang Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 120 days.

(21) Appl. No.: 15/923,916

(22) Filed: Mar. 16, 2018

(65) Prior Publication Data
US 2018/0204238 A1 Jul. 19, 2018

Related U.S. Application Data

(63) Continuation of application No. PCT/CN2016/109726, filed on Dec. 13, 2016.

(30) Foreign Application Priority Data

Feb. 5, 2016 (CN) .......................... 201610083278.9

(51) Int. Cl.
*G06Q 30/02* (2012.01)
*H04L 29/08* (2006.01)

(52) U.S. Cl.
CPC ......... *G06Q 30/0222* (2013.01); *G06Q 30/02* (2013.01); *G06Q 30/0224* (2013.01); *H04L 67/32* (2013.01); *H04L 67/26* (2013.01)

(58) Field of Classification Search
CPC ........... G06Q 30/0222; G06Q 30/0214; G06Q 30/0224
(Continued)

(56) References Cited

U.S. PATENT DOCUMENTS

| 2007/0265921 | A1* | 11/2007 | Rempe | G06Q 30/02 705/14.16 |
| 2012/0166261 | A1 | 6/2012 | Velusamy et al. | |

(Continued)

FOREIGN PATENT DOCUMENTS

| CN | 103177370 A | 6/2013 |
| CN | 105049539 A | 11/2015 |

(Continued)

OTHER PUBLICATIONS

Korean Office Action for KR10-2018-7009788, dated Jun. 19, 2019, English translation provided.

(Continued)

*Primary Examiner* — Azam A Ansari
(74) *Attorney, Agent, or Firm* — Oblon, McClelland, Maier & Neustadt, L.L.P.

(57) ABSTRACT

Embodiments include information processing methods, a server, a terminal, and non-transitory computer-readable storage mediums. One information processing method includes receiving a request for electronic information. The request for the electronic information is sent by a first user logged into a first terminal. The method includes recommending and sharing at least one piece of recommended information, which corresponds to the electronic information, to at least one second user according to a recommendation and/or sharing rule associated with the electronic information. The at least one second user is associated with the first user. The method further includes, when the at least one second user logs into a second terminal and performs a (Continued)

function based on the at least one piece of recommended information, sending at least one piece of content information to a database accessible by the first user according to the at least one piece of recommended information.

19 Claims, 10 Drawing Sheets

(58) Field of Classification Search
 USPC .................................................... 705/14.23
 See application file for complete search history.

(56) References Cited

U.S. PATENT DOCUMENTS

| | | | | |
|---|---|---|---|---|
| 2012/0316941 | A1* | 12/2012 | Moshfeghi | G06Q 30/02 705/14.16 |
| 2013/0254035 | A1* | 9/2013 | Ramer | G06Q 30/0256 705/14.62 |
| 2014/0180802 | A1* | 6/2014 | Boal | G06Q 30/0211 705/14.49 |

FOREIGN PATENT DOCUMENTS

| | | |
|---|---|---|
| CN | 105243569 A | 1/2016 |
| CN | 105787755 A | 7/2016 |
| JP | 2013-214195 A | 10/2013 |
| JP | 2014-529110 A | 10/2014 |
| JP | 2015-201107 A | 11/2015 |
| KR | 20070035022 A | 3/2007 |
| KR | 100894076 B1 | 4/2009 |
| KR | 101238224 B1 | 3/2013 |

OTHER PUBLICATIONS

International Search Report for PCT/CN2016/109726, dated Mar. 1, 2017.
Written Opinion of the International Searching Authority, dated Mar. 1, 2017.
Korean Office Action for KR10-2018-7009788, dated Jun. 19, 2019, English translation prodded.
Written Opinion of the ISA for corresponding PCT/CN2016/109726, dated Mar. 1, 2017.
International Preliminary Report on Patentability for corresponding PCT/CN2016/109726, dated Aug. 7, 2018.
Japanese Office Action for corresponding JP2018-518415, dated Feb. 1, 2019, Machine translation provided.
Chinese Office Action dated Feb. 5, 2016, in Chinese Patent application 2016100632789, 10 pg., with English explanation of relevance.
Chinese Office Action dated Jun. 1, 2017, in Chinese Patent application 2016100832789, 6 pg., with English explanation of relevance.
Chinese Office Action dated Oct. 10, 2017, in Chinese Patent application 2016100832789, 11 pg., with English explanation of relevance.
Chinese Office Action dated Jan. 30, 2018, in Chinese Patent application 2016100832789; 6 pg., with English explanation of relevance.
International Search Report issued in corresponding PCT/CN2016/109726, dated Mar. 1, 2011, 6 pg.

* cited by examiner

INFORMATION PROCESSING METHOD, SERVER, FIRST TERMINAL, AND COMPUTER STORAGE MEDIUM

RELATED APPLICATION

This application is a continuation of International Application No. PCT/CN2016/109726, filed on Dec. 13, 2016, which claims priority to Chinese Patent Application No, 201610083278.9, filed with the Chinese Patent Office on Feb. 5, 2016, and entitled "INFORMATION PROCESSING METHOD, SERVER, AND FIRST TERMINAL." The entire disclosures of the prior applications are hereby incorporated by reference in their entirety.

FIELD OF THE TECHNOLOGY

The present disclosure relates to communication technologies, and in particular, to an information processing method, a server, a first terminal, and a computer storage medium.

BACKGROUND OF THE DISCLOSURE

In daily life, information exchange is a commonly used means. For example, application scenarios of information exchange include various life service scenarios. In one life service scenario, for example, a user may go to a supermarket and use a shopping card provided by the supermarket to buy goods. In another life service scenario, a user may use a fuel card to pay for fuel. With the development of Internet technologies and intelligent terminals, such information related to life service scenarios may in both physical cards and virtual cards. A specific implementation of a virtual card is a ticket. A ticket may be used to establish a new channel for information exchange between a user (such as a merchant) of a first terminal and a user (such as a consumer) of a second terminal, where the user of the first terminal offers a life service and the user of the second terminal uses the life service. By means of such a novel mechanism of information exchange, information not only can be exchanged between a user (such as a merchant) of a first terminal and a user (such as a customer) of a second terminal, but also can be exchanged between multiple users (such as customers) of second terminals. That is, information can be shared in various exchange modes.

Currently, the foregoing exchange modes are used to share information, so that after a user uses a received ticket, a message indicating that the ticket has been used may be pushed to the user, but no further feedback or response is provided for the consuming behavior of the user. The processing efficiency and response speed of such information sharing are not high. In the related technology, there is still no effective solution to this problem.

SUMMARY

In view of this, embodiments of the present disclosure intend to provide information processing methods, a server, a terminal, and non-transitory computer-readable storage mediums, so as to at least resolve the problem in the existing technology.

The technical solutions of the embodiments of the present disclosure are implemented as follows:

In one embodiment of the present disclosure, there is provided an information processing method that includes receiving a request for electronic information. The request for the electronic information is sent by a first user logged into a first terminal. The method includes recommending and sharing, by processing circuitry of an information processing apparatus, at least one piece of recommended information, which corresponds to the electronic information, to at least one second user according to a recommendation and/or sharing rule associated with the electronic information, the at least one second user being associated with the first user. The method further includes, when the at least one second user logs into a second terminal and performs a function based on the at least one piece of recommended information, sending by the circuitry of the information processing apparatus at least one piece of content information to a database accessible by the first user according to the at least one piece of recommended information.

In one embodiment of the present disclosure, there is provided an information processing method that includes sending, by a first user logged into a first terminal, a request for electronic information to a server. The method includes receiving, by the first user logged into the first terminal, at least one piece of content information when at least one second user that is associated with the first user logs into a second terminal and receives at least one piece of recommended information corresponding to the electronic information and performs a function based on the at least one piece of recommended information. The at least one piece of content information is generated by the server according to the at least one piece of recommended information.

In one embodiment of the present disclosure, there is provided a server including circuitry. The circuitry configured to receive a request for electronic information. The request for the electronic information is sent by a first user logged into a first terminal. The circuitry is configured to recommend and share at least one piece of recommended information, which corresponds to the electronic information, to at least one second user according to a recommendation and/or sharing rule associated with the electronic information. The at least one second user being associated with the first user. The circuitry is configured to send at least one piece of content information to a database accessible by the first user according to the at least one piece of recommended information when the at least one second user logs into the second terminal and performs a function based on the at least one piece of recommended information.

A central processing unit (CPU), a digital signal processor (DSP), or a field-programmable gate array (FPGA) may be used for implementing the above-described circuitry.

In one embodiment of the present disclosure, there is provided a first terminal including circuitry. The circuitry is configured to send a request for electronic information to a server. The circuitry is configured to receive at least one piece of content information when at least one second user that is associated with the first user logs into a second terminal and receives at least one piece of recommended information corresponding to the electronic information and performs a function based on the at least one piece of recommended information. The at least one piece of content information is generated by the server according to the at least one piece of recommended information.

The circuitry may be implemented by using a CPU, a DSP, or FPGA.

An embodiment of the present disclosure further provides a non-transitory computer-readable storage medium storing computer executable instructions which when executed by a computer cause the computer to perform any of the foregoing information processing methods.

The information processing method in certain embodiments of the present disclosure includes: receiving the first request that is for the electronic coupon information and is sent by the first user logging into the first terminal; recommending and sharing, when it is obtained through parsing that the first request is used for instructing to redeem the electronic coupon information and according to the recommendation and sharing policy associated with the electronic coupon information, the at least one piece of recommended coupon information corresponding to the electronic coupon information to the at least one second user that is in the friend list of the first user and logs into the second terminal; and when it is detected that the at least one second user logging into the second terminal redeems the recommended coupon information, sending the at least one virtual article to the account of the first user according to the payment policy associated with the recommended coupon information.

According to certain embodiments of the present disclosure, the at least one piece of recommended coupon information corresponding to the electronic coupon information is recommended and shared, according to the recommendation and sharing policy associated with the electronic coupon information, to the at least one second user that is in the friend list of the first user and logs into the second terminal; and the at least one virtual article is sent to the account of the first user when it is detected that the at least one second user logging into the second terminal redeems the recommended coupon information and according to the payment policy associated with the recommended coupon information, so that after a user uses received electronic coupon information, information indicating that the electronic coupon information is used is pushed to the user, and a feedback and a response are further provided for the consuming behavior of the user, so as to obtain a virtual article. Higher processing efficiency and a higher response speed can be achieved by means of such information sharing.

DESCRIPTION OF EMBODIMENTS

Specific implementations of the technical solutions are further described in detail below with reference to the accompanying drawings.

Figure 1:
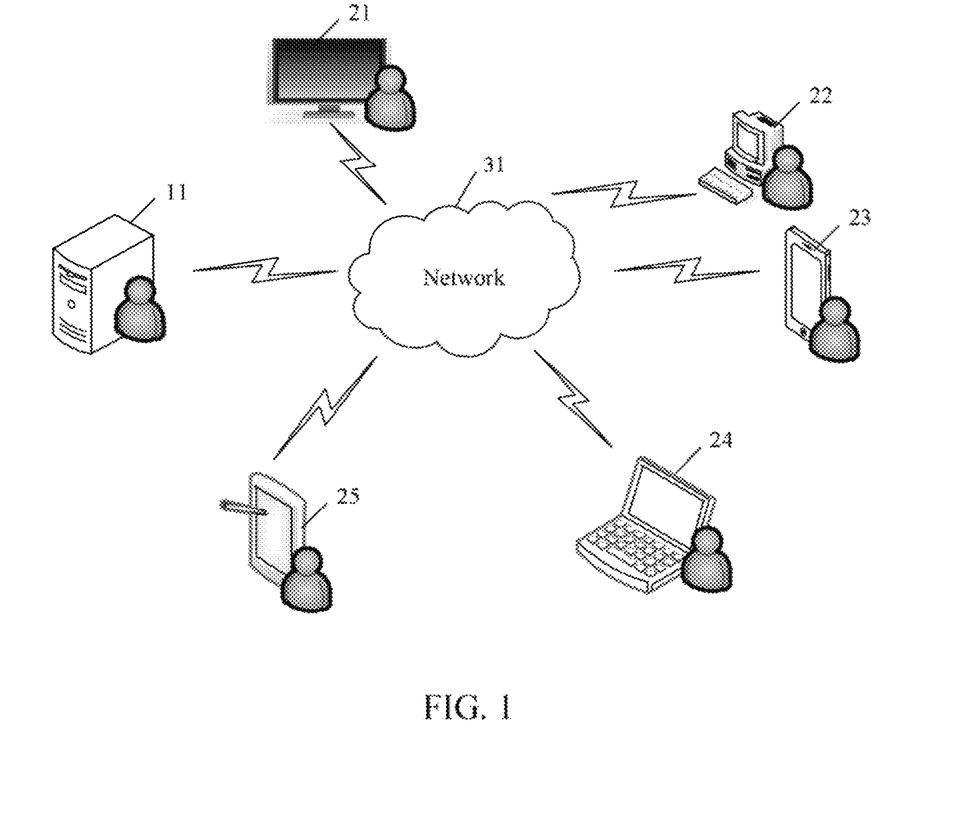
FIG. 1 is a schematic diagram of various hardware entities exchanging information according to an embodiment of the present disclosure.

FIG. 1 is a schematic diagram of various hardware entities exchanging information according to an embodiment of the present disclosure. FIG. 1 includes one or more servers, where a server 11 in FIG. 1 is merely an example, terminal devices 21 to 25, and a network 31. The network 31 includes network entities such as a router and a gateway. The terminal devices 21 to 25 exchange information with the server 11 by using a wired network or a wireless network 31. The terminal devices 21 to 25 may also exchange information with each other. Each of the terminal devices 21 to 25 can download an application and/or an application update data package and/or application-related data information or service information from the server 11. Types of the terminal device are shown in FIG. 1, including a mobile phone 23, a tablet computer or a PDA 25, a desktop computer 22, a PC 24, and an all-in-one PC machine 21. Various applications required by a user, for example, an application having a social networking function (such as WeChat), or an application having an entertainment function (such as a video application, an audio playing application, a game application or reading software), or an application having a service function (such as a map navigation application or a group-purchase application), are installed on the terminal devices.

Based on the system shown in FIG. 1, an example in which exchanged information is ticket or coupon information is used. By using the embodiments of the present disclosure, each of the terminal devices 21 to 25 may be a first terminal that uses electronic information, such as ticket or coupon information, or a second terminal that receives electronic information, such as ticket or coupon information, shared by the first terminal. In an information exchange process, the first terminal may be changed into the second terminal, and the second terminal may be changed into the first terminal. The first terminal and the second terminal are both terminals corresponding to a receiver of ticket or coupon information, for example, terminals logged into by ordinary users, and use, by using ticket or coupon information that is issued by a merchant based on a platform such as a WeChat platform, various services provided by the merchant. The first terminal and the second terminal exchange information with each other, or may exchange information with the merchant or a server. The merchant that provides services to the first terminal and the second terminal is not limited to an advertiser. It is noted that an electronic device used by a merchant to provide services involved in this specification may be a terminal, a server, or a system architecture including a terminal and a server.

By using the embodiments of the present disclosure, the ticket or coupon information set by the merchant may be directly sent to the first terminal or the second terminal for use, or may be centrally managed by a platform such as the Wechat platform. The platform such as the WeChat platform issues the ticket or coupon information to the first terminal or the second terminal for use. A server recommends and shares, according to a recommendation and sharing policy associated with electronic coupon information, at least one piece of recommended information, such as recommended coupon information corresponding to the electronic coupon information, to at least one second user that is in a friend list of a first user and logs into a second terminal; and when it is detected that the at least one second user logging into the second terminal redeems the recommended coupon information, sends at least one content information, such as a virtual article, to an account of the first user according to a payment policy associated with the recommended coupon information, so that after a user uses received electronic coupon information, information indicating that the electronic coupon information is used is pushed to the user, and a feedback and a response are further provided for the consuming behavior of the user, so as to obtain a virtual article. Higher processing efficiency and a higher response speed can be achieved by means of such information sharing.

The example of FIG. 1 is merely an instance of the;system architecture for implementing the embodiments of the present disclosure, and the embodiments of the present disclosure are not limited to the system architecture shown in FIG. 1. Various embodiments of the present disclosure are provided based on the system architecture.

Embodiment 1

Figure 2:
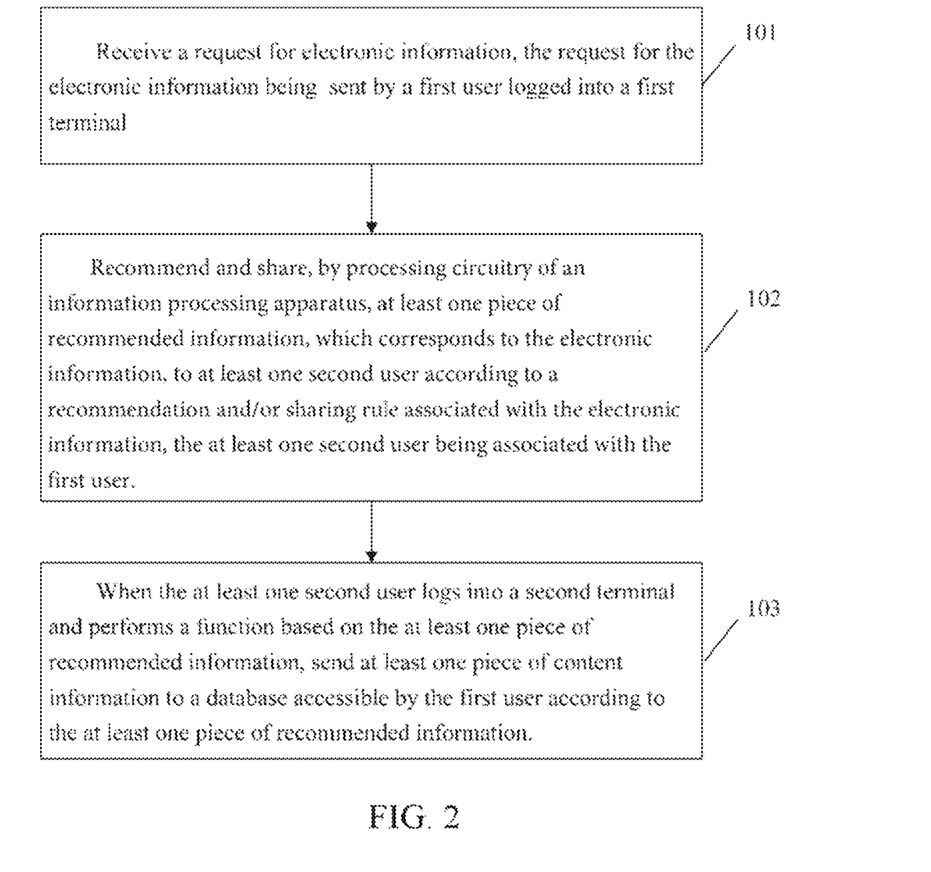
FIG. 2 is a schematic diagram of an implementation procedure according to Embodiment 1 of the present disclosure.

This embodiment of the present disclosure provides an information processing method. As shown in FIG. 2, the method is applied to a server, including the following steps:

Step 101: Receive a first request that is for electronic coupon information and is sent by a first user logged into a first terminal.

In this step, the first terminal and a second terminal are both terminals corresponding to a receiver of ticket or coupon information, for example, terminals logged into by ordinary users, and use, by using ticket or coupon information that is issued by a merchant based on a platform such as a WeChat platform, various services provided by the merchant. The first terminal and the second terminal exchange information with each other, or may exchange information with the merchant or the server. For example, after receiving the electronic coupon information (such as a ticket or a coupon) set by the merchant, the first terminal may directly send the ticket or coupon information to the second terminal, or the ticket or coupon information may be centrally managed by the platform such as the WeChat platform. The platform such as the WeChat platform issues the electronic information, such as the ticket or coupon information, to the second terminal. The electronic coupon information has an information amount, for example, a voucher having "30 RMB" of a coffee shop or a coupon having "20% off".

Step 102: Recommend and share, when it is obtained through parsing that the first request is used for instructing to redeem the electronic coupon information and according to a recommendation and/or sharing policy/rule associated with the electronic coupon information, at least one piece of recommended coupon information corresponding to the electronic coupon information to at least one second user that is in a friend list of (or otherwise associated with) the first user and logs in to a second terminal.

Specifically, step 102 includes obtaining through parsing identification information that is used for identifying the second user and is carried in the first request; obtaining indication information that is in the first request and is used for performing a function based on the electronic information, such as redeeming the electronic information, and determining, according to the indication information, that the first user has performed the function; and sending, according to the recommendation and sharing policy associated with the electronic coupon information, the at least one piece of recommended coupon information corresponding to the electronic coupon information to the second user corresponding to the identification information.

Step 103: When it is detected that the at least one second user logged into the second terminal and performs a function, e.g., redeems the recommended coupon information, send at least one piece of content information such as a virtual article to an account of or a databased accessible by the first user according to a payment policy associated with the recommended coupon information.

Figure 3:
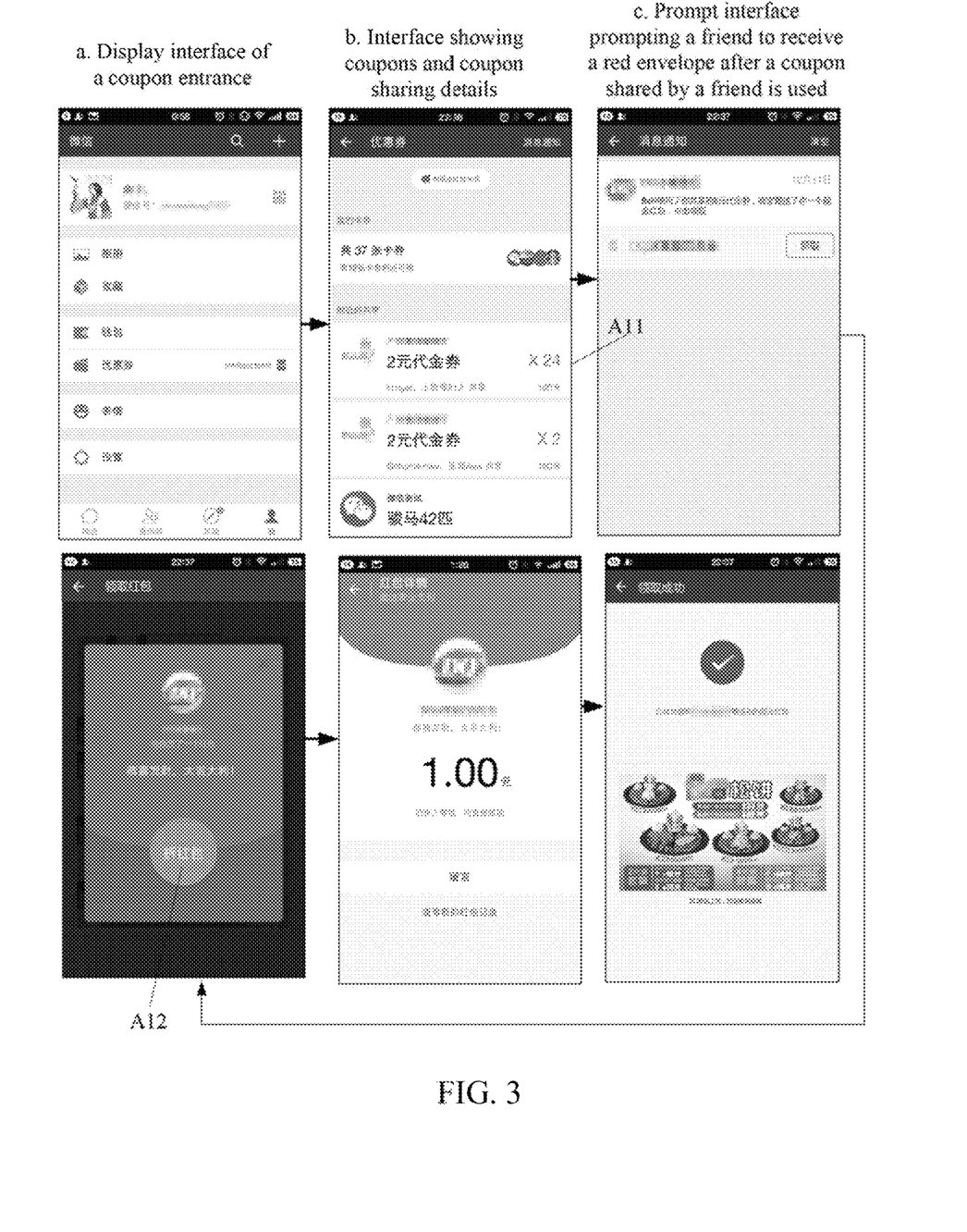
FIG. 3 is a schematic diagram of a plurality of UI interfaces of a red envelope receiving process according to an embodiment of the present disclosure.

That a red envelope is given to a friend as a cash reward after a person uses an electronic coupon shared by the friend can be implemented by means of steps 102 and 103. As shown in FIG. 3, a friend enters a coupon and a coupon sharing page through the "Cards & Offers" entrance of WeChat. The friend shares, to friends of the friend, a coupon (for example, coupon information indicated by A11) sent by a merchant to the friend. After a friend of the friend uses the coupon, a redemption request is sent (the redemption request includes identification information of the friend), so that the friend can be found by using the identification information of the friend, to send a red envelope as a cash reward. Then, a prompt page indicating that a coupon can be received is displayed on the page of WeChat of the friend. The friend clicks a "receive" button to pull an "open red envelope" page. The "open red envelope" page includes an "open" button indicated by A12. The friend clicks the "open" button to enter a page showing details about the red envelope and successfully receives the red envelope. That is, the first user may obtain a corresponding rewarded virtual article after the second user redeems a ticket shared by the first user. The virtual article rewards a red envelope, cash, a coupon, and the like.

Embodiment 2

Figure 4:
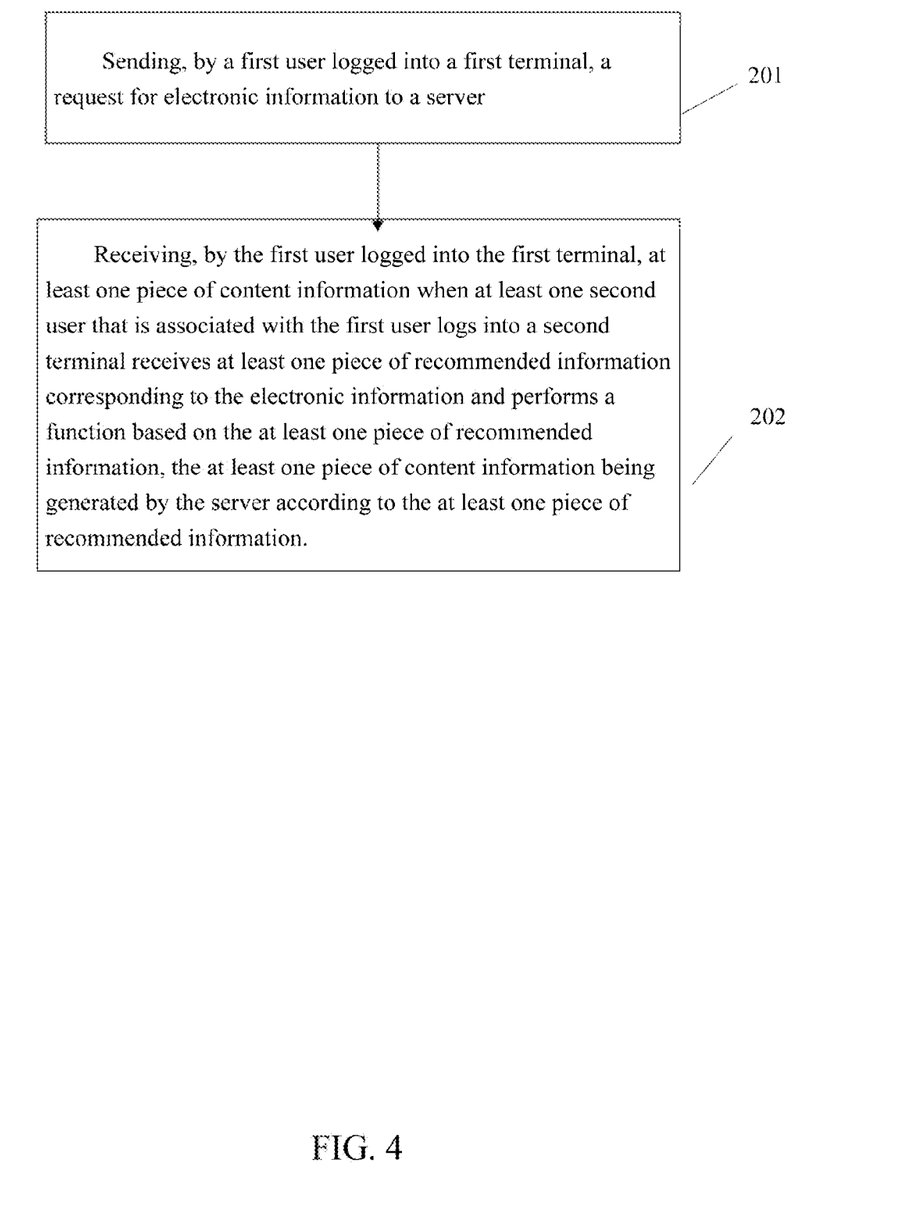
FIG. 4 is a schematic diagram of an implementation procedure according to Embodiment 2 of the present disclosure.

This embodiment of the present disclosure provides an information processing method. As shown in FIG. 4, the method is applied to a first terminal, including the following steps:

Step 201: A first user logged into the first terminal sends a first request for electronic coupon information, the first request being used for instructing to redeem the electronic coupon information.

Herein, in this step, the first terminal and a second terminal are both terminals corresponding to a receiver of ticket or coupon information, for example, terminals logged into by ordinary users, and use, by using ticket or coupon information that is issued by a merchant based on a platform such as a WeChat platform, various services provided by the merchant. The first terminal and the second terminal exchange information with each other, or may exchange information with the merchant or a server. For example, after receiving the electronic coupon information (such as a ticket or a coupon) set by the merchant, the first terminal may directly send the ticket or coupon information to the second terminal, or the ticket or coupon information may be centrally managed by the platform such as the WeChat platform. The platform such as the Wechat platform issues the ticket or coupon information to the second terminal. The electronic coupon information has an information amount, for example, a voucher having "30 RMB" of a coffee shop or a coupon having "20% off".

Step 202: The first user logged into the first terminal receives at least one piece of content information such as virtual article when it is detected that at least one second user that is in a friend list of the first user and logs into a second terminal that receives at least one piece of recommended coupon information corresponding to the electronic coupon information and redeems the recommended coupon information.

Herein, the server obtains through parsing identification information that is used for identifying the second user and is carried in the first request; obtains indication information that is in the first request and is used for redeeming the electronic coupon information and determines, according to the indication information, that the first user has used the electronic coupon information; and sends, according to the recommendation and sharing policy associated with the electronic coupon information, the at least one piece of recommended coupon information corresponding to the electronic coupon information to the second user corresponding to the identification information. The virtual article may be sent, by using the identification information identifying the second user, to the first user logged into the first terminal.

Herein, the virtual article is generated by the server according to a payment policy associated with the recommended coupon information.

Embodiment 3

Figure 5:
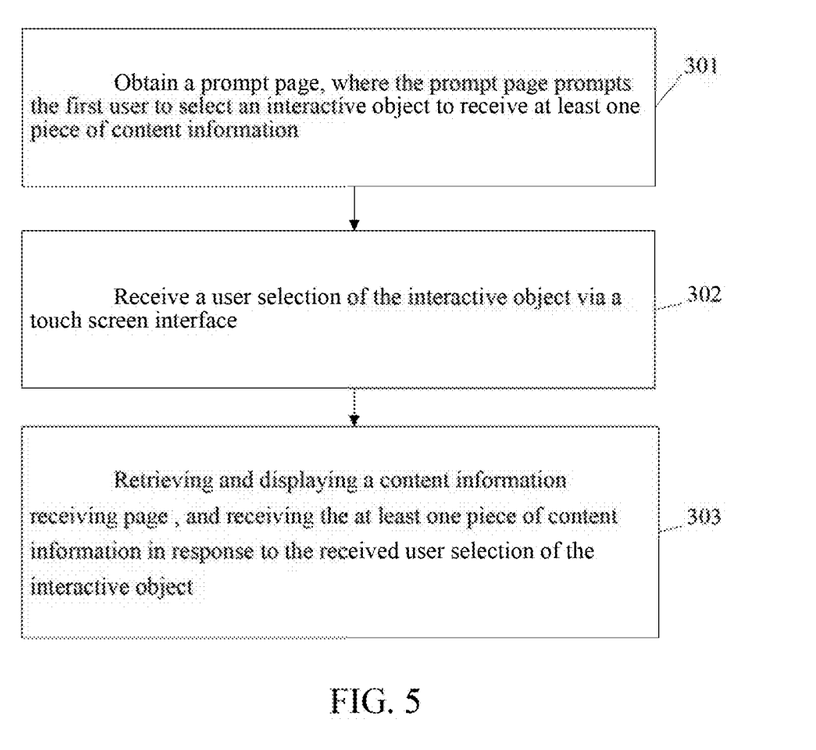
FIG. 5 is a schematic diagram of an implementation procedure according to Embodiment 3 of the present disclosure.

This embodiment of the present disclosure provides an information processing method. As shown in FIG. 5, the method is applied to a first terminal, including the following steps:

Step 301: A first user logged into the first terminal sends a first request for electronic information, the first request being used for instructing to redeem the electronic coupon information. The first users obtains a prompt page, wherein the prompt page prompts the first user to select an interactive object to receive the at least one piece of content information.

Herein, in this step, the first terminal and a second terminal are both terminals corresponding to a receiver of ticket or coupon information, for example, terminals logged into by ordinary users, and use, by using ticket or coupon information that is issued by a merchant based on a platform such as a WeChat platform, various services provided by the merchant. The first terminal and the second terminal exchange information with each other, or may exchange information with the merchant or a server. For example, after receiving the electronic coupon information (such as a ticket or a coupon) set by the merchant, the first terminal may directly send the ticket or coupon information to the second terminal, or the ticket or coupon information may be centrally managed by the platform such as the WeChat platform. The platform such as the WeChat platform issues the ticket or coupon information to the second terminal. The electronic coupon information has an information amount, for example, a voucher having "30 RMB" of a coffee shop or a coupon having "20% off".

Step 302: Receiving a user selection of the interactive object via a touch screen interface. For example, a first prompt page is obtained, where the first prompt page is used for prompting the first user to receive a virtual article corresponding to the electronic coupon information.

Step 303: In response to the received user selection of the interactive object, retrieve and display a content information receiving page, and receive the at least one piece of content information.

For example, in one embodiment, the prompt page includes an interactive object (such as a "receive" button), a touch operation acting on the interactive object is received, a virtual article receiving page is accessed by using a receiving interface, and the virtual article is received.

Herein, the first terminal, the second terminal, and the server interact with each other. The server obtains through parsing identification information that is used for identifying the second user and is carried in the first request; obtains indication information that is in the first request and is used for redeeming the electronic coupon information, and determines, according to the indication information, that the first user has used the electronic coupon information; and sends, according to the recommendation and sharing policy associated with the electronic coupon information, the at least one piece of recommended coupon information corresponding to the electronic coupon information to the second user corresponding to the identification information. The virtual article may be sent, by using the identification information identifying the second user, to the first user logging into the first terminal. The virtual article is generated by the server according to a payment policy associated with the recommended coupon information. The virtual article rewards a red envelop, cash, a coupon, and the like.

By means of steps 302 and 303, a prompt page indicating that a coupon can be received is displayed on a page of WeChat of a friend when it is detected that the at least one second user that is in the friend list of the first user and logs into the second terminal receives the at least one piece of recommended coupon information, corresponding to the electronic coupon information and redeems the recommended coupon information, and the first prompt page (for example, an "open red envelope" page Shown in FIG. 3) is pulled. The friend clicks a "receive" button on the page. The "open red envelope" page includes an "open" button indicated by A12. The friend clicks the "open" button to enter a page showing details about the red envelope, and successfully receives the red envelope.

Embodiment 4

Figure 6:
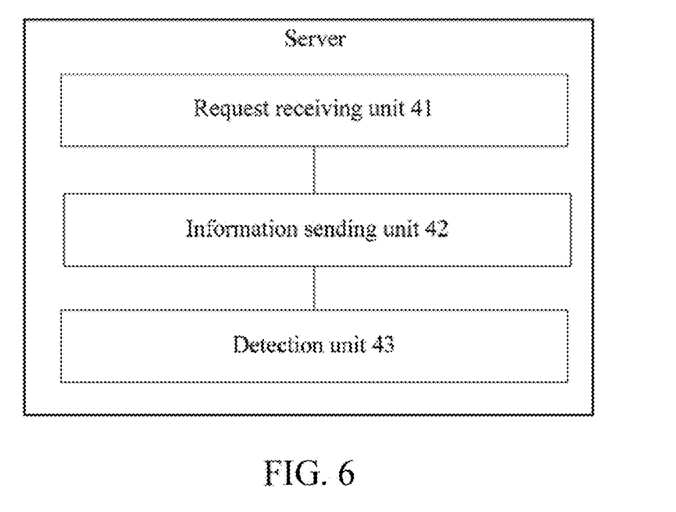
FIG. 6 is a schematic diagram of a composition structure according to Embodiment 4 of the present disclosure.

This embodiment of the present disclosure provides a server. As shown in FIG. 6, the server includes: a request receiving unit 41, configured to: receive a first request that is for electronic coupon information and is sent by a first user logging into a first terminal; an information sending unit 42, configured to recommend and share, when it is obtained through parsing that the first request is used for instructing to redeem the electronic coupon information and according to a recommendation and sharing policy associated with the electronic coupon information, at least one piece of recommended coupon information corresponding to the electronic coupon information to at least one second user that is in a friend list of the first user and logs into a second terminal; and a detection unit 43, configured to: when it is detected that the at least one second user logging into the second terminal redeems the recommended coupon information, send at least one virtual article to an account of the first user according to a payment policy associated with the recommended coupon information.

In an implementation of this embodiment of the present disclosure, the information sending unit is further configured to: obtain through parsing identification information that is used for identifying the second user and is carried in the first request; obtain indication information that is in the first request and is used for redeeming the electronic coupon information, and determine, according to the indication information, that the first user has used the electronic coupon information; and send, according to the recommendation and sharing policy associated with the electronic coupon information, the at least one piece of recommended coupon information corresponding to the electronic coupon information to the second user corresponding to the identification information.

Embodiment 5

Figure 7:
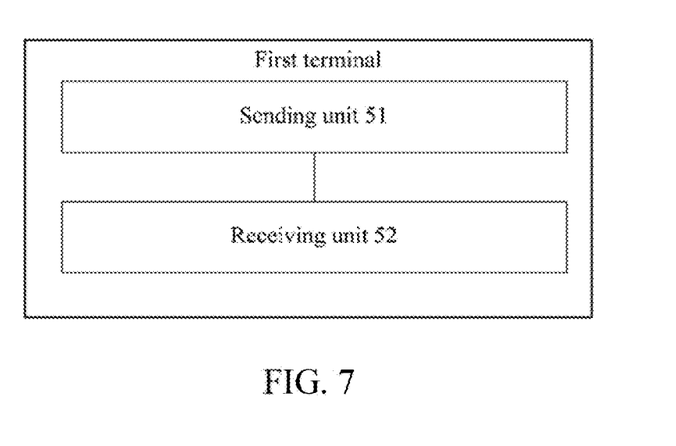
FIG. 7 is a schematic diagram of a composition structure according to Embodiment 5 of the present disclosure.

This embodiment of the present disclosure provides a first terminal. As shown in FIG. 7, the first terminal includes: a sending unit 51 configured to send, by a first user logging into the first terminal, a first request for electronic coupon information, the first request being used for instructing to redeem the electronic coupon information; and a receiving unit 52, configured to: receive at least one virtual article by the first user logging into the first terminal and when it is detected that at least one second user that is in a friend list of the first user and logs into a second terminal receives at least one piece of recommended coupon information corresponding to the electronic coupon information and redeems the recommended coupon information, the virtual article being generated by a server according to a payment policy associated with the recommended coupon information.

In an implementation of this embodiment of the present disclosure, the sending unit is further configured to add identification information used for identifying the second user to the first request, so that the server finds the second user according to the identification information, and sends the at least one piece of recommended coupon information corresponding to the electronic coupon information to the second user corresponding to the identification information.

In an implementation of this embodiment of the present disclosure, the sending unit is further configured to add indication information used for redeeming the electronic coupon information to the first request, so that the server determines, according to the indication information, that the second user has used the electronic coupon information that is shared by the first user to the second user.

In an implementation of this embodiment of the present disclosure, the receiving unit is further configured to:

obtain a first prompt page, where the first prompt page is used for prompting the first user to receive the virtual article corresponding to the electronic coupon information; and the first prompt page includes an interactive object; and receive a touch operation acting on the interactive object, jump to a virtual article receiving page by using a receiving interface, and receive the virtual article.

Embodiment 6

It is noted herein that the foregoing terminal device (such as the first terminal or the second terminal) may be an electronic device such as a PC, or may be a portable electronic device such as a PAD, a tablet computer, or a laptop, or may be an intelligent mobile terminal such as a mobile phone. This is not limited to the descriptions herein. The server may be an electronic device that includes a cluster system and in which various functional units are combined into one or are separately disposed. A client and the server both include at least a database configured to store data and a processor configured to process data or include a storage medium disposed in the server or a storage medium independently disposed.

The processor configured to process data may be implemented, when performing processing, by using a microprocessor, a central processing unit (CPU), a digital signal processor (DSP), or a field-programmable gate array (FPGA). The storage medium includes operation instructions. The operation instructions may be computer executable code. The steps in the procedures of the information processing methods in the embodiments of the present disclosure are implemented by using the operation instructions.

Figure 8:
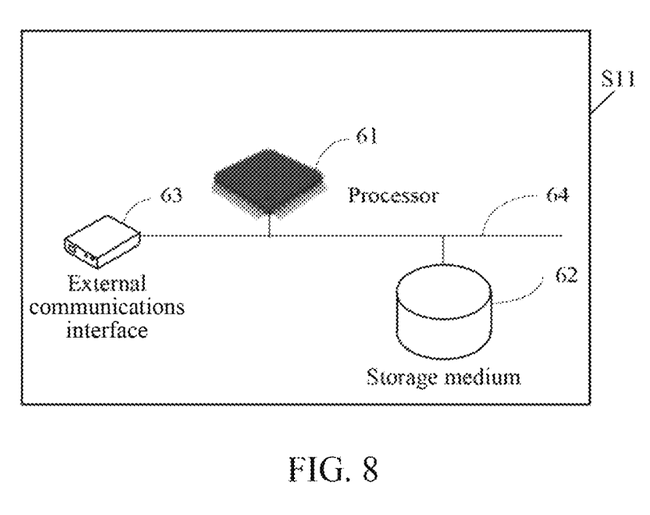
FIG. 8 is a schematic diagram of a hardware composition structure according to Embodiment 5 of the present disclosure.

An example in which the terminal device (such as the first terminal or the second terminal) and the server are used as a hardware entity S11 is shown in FIG. 8. The apparatus includes a processor 61, a storage medium 62, and at least one external communications interface 63. The processor 61, the storage medium 62, and the external communications interface 63 are connected through a bus 64.

It is noted herein that the foregoing descriptions of the terminal device (such the first terminal or the second terminal) and the server are similar to the descriptions of the foregoing method. Details about descriptions of beneficial effects of the same method are not described again. For technical details that are not disclosed in the embodiments of the client and the server of the present disclosure, refer to the descriptions of the method embodiments of the present disclosure.

This embodiment of the present disclosure is described as follows by using an actual application scenario as an example:

This embodiment of the present disclosure is used in this application scenario, and is a cash reward technical solution having a rebate capability after a ticket is redeemed. A rebate after the redemption is a targeted reward based on the receiving and redemption behavior of a user. After a coupon received and shared by a user A is redeemed by a user B, a cash red envelope reward can be given to the user A according to a rule set by a merchant. When the related technology is used in this application scenario, after the coupon received by the user A is used by B, a message indicating that the coupon is used by B is pushed to the user A. However, currently, there is no capability of carrying a cash reward. That is, a conventional coupon does not provide more benefit for stimulation in coupon receiving and sharing other than the discount itself. As a result, users are not enthusiastic about coupon receiving. Consequently, it is difficult for the merchant to further expand promotion, and it is also difficult to give a targeted reward according to a rule based on the receiving and sharing behavior of the user.

If this embodiment of the present disclosure is used in this application scenario, the foregoing problem is resolved. A cash reward can be given after ticket redemption. Specifically, in expansion based on features of ticket redemption, in a scenario of sharing a coupon to a friend, after a coupon received and shared by the user A is redeemed by the user B, a cash reward can be given to the user A according to a setting of the merchant, and a reward form is currently embodied as an enterprise red envelope. A targeted reward according to a particular rule is given by the merchant to the user based on the receiving and sharing behavior of the user and by using this embodiment of the present disclosure. Benefit between a receiver and a user is balanced in the life cycle of a coupon shard by a friend (the user gets the discount of the coupon, and there is further benefit such as a split coupon obtained after redemption). Therefore, the marketing capability of the merchant is greatly improved, the spread and promotion are significantly facilitated, and moreover, desirable experience from coupon receiving to coupon using of the user is further improved.

Figure 10:
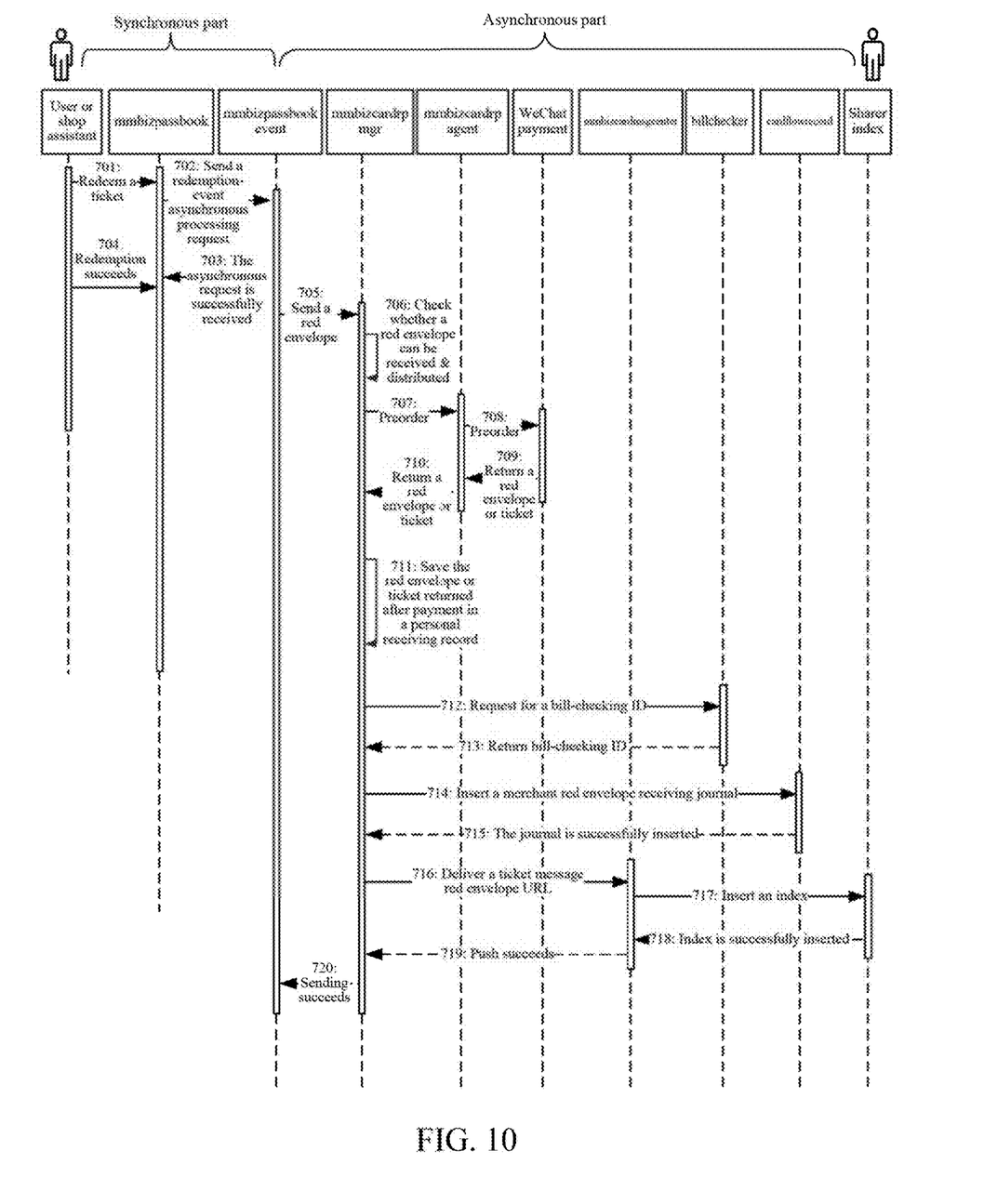
Figure 11:
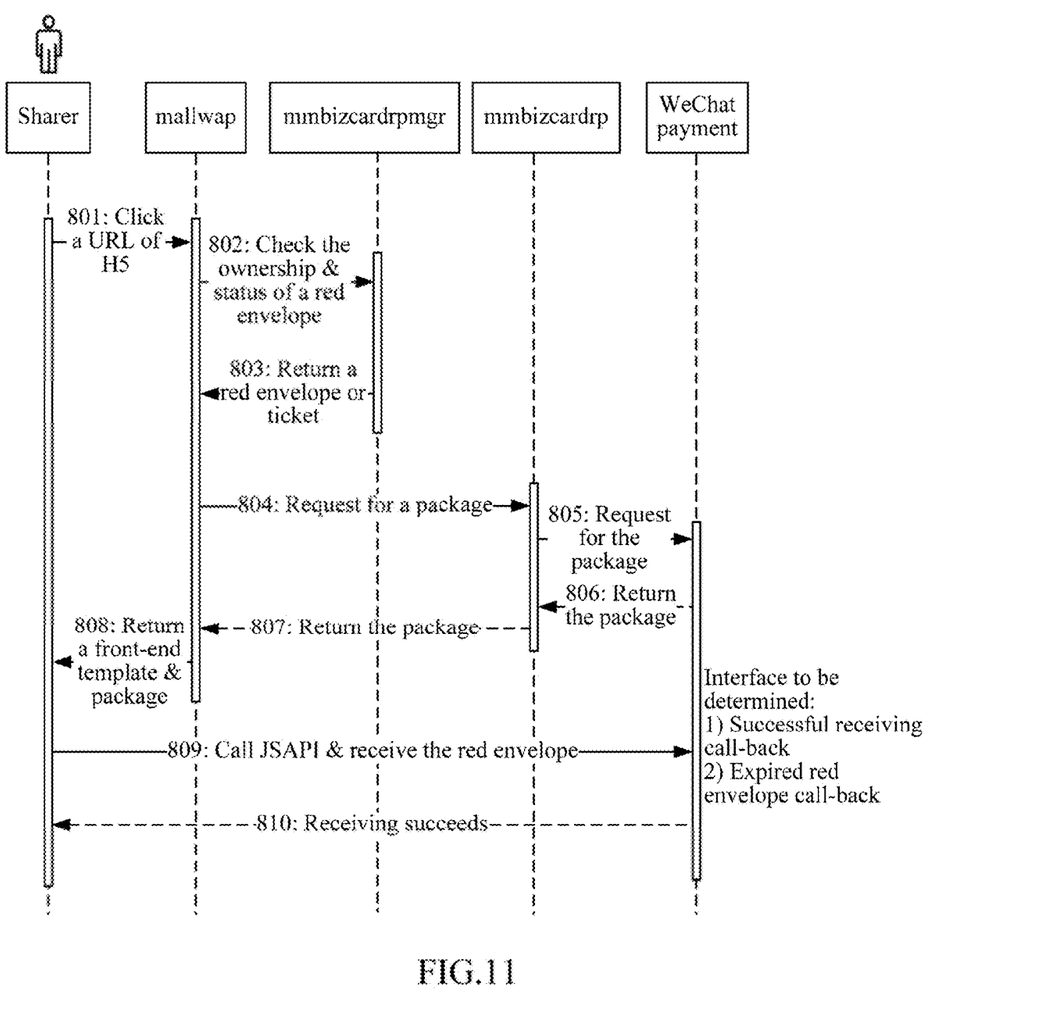

This embodiment of the present disclosure is used in this application scenario. A ticket and a red envelope template are set in a back-end server, and the red envelope template is associated with the ticket. After the user B uses the coupon shared by the user A, a redemption-event asynchronous processing request is sent to a back end. The redemption request succeeds to enter a process of giving a red envelope. First, a red envelope is preordered according to a rule of the red envelope template that is set by the merchant on the back end, for example, a ticket is saved (information such as a red envelope amount is saved in the ticket). Meanwhile, the back end delivers a ticket redemption message to a client. The user clicks the "receive" button under this message, clicks the URL of, e.g., HTML5 (H5) presented in the message, and receives the red envelope by pulling the original page JSAPI by using the ticket. A specific implementation process of this embodiment of the present disclosure is shown in FIG. 9 to FIG. 11.

Figure 9:
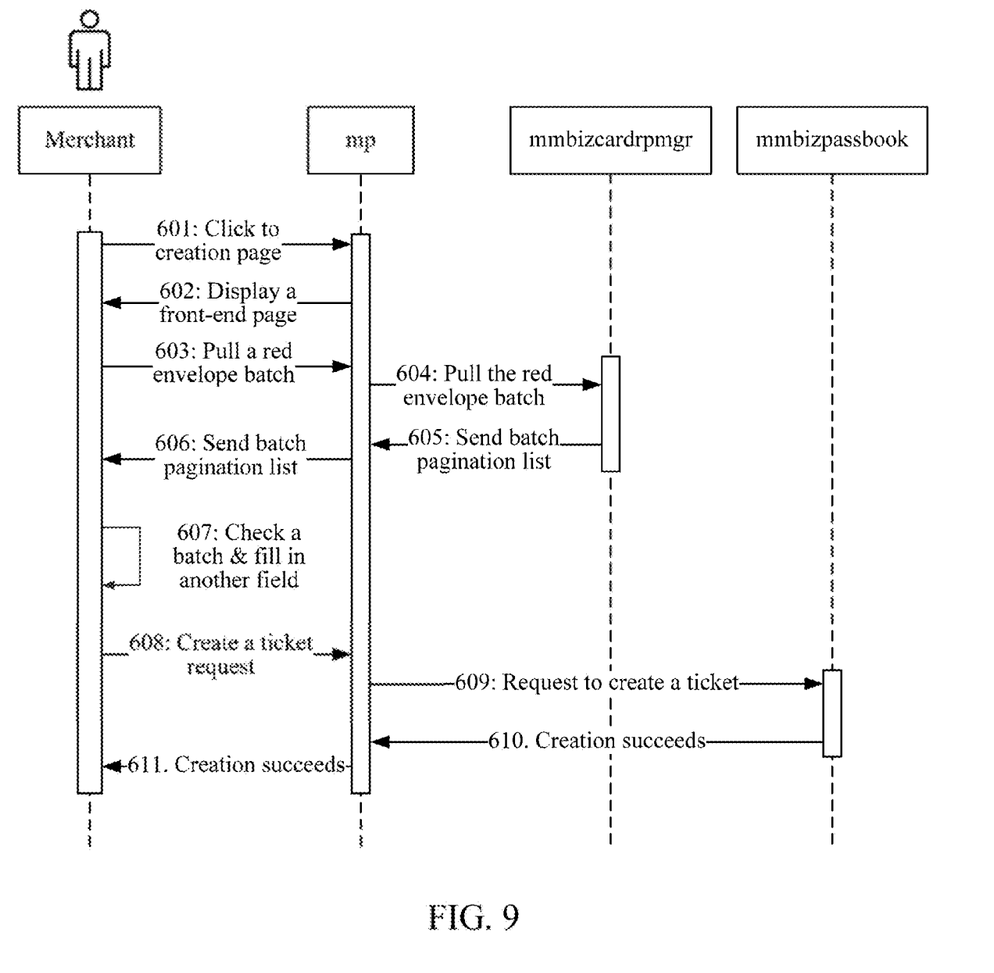
FIG. 9 to FIG. 11 are schematic diagrams of implementation procedures of a plurality of application scenarios according to an embodiment of the present disclosure.

A process of associating the red envelope with a time sequence of the ticket is shown in FIG. 9. A process in which the merchant exchanges information with the back-end server includes the following steps:

Steps 601 and 602: Click a creation page, and display a front-end page.

Steps 603 and 604: Pull a red envelope batch.

Steps 605 and 606: Send a batch pagination list.

Steps 607 to 609: Check a batch & fill in another field, and create a ticket request.

Steps 610 and 611: Creation succeeds.

A redemption rebate time sequence process is shown in FIG. 10. A process in which a user and a sharer of a ticket or a coupon exchange information with a merchant and a back-end server includes the following steps:

Steps 701 and 702: Redeem a ticket, and send a redemption-event asynchronous processing request.

Steps 703 and 704: The asynchronous request is successfully received, and redemption succeeds.

Steps 705 to 708: Send a red envelope, check whether a red envelope can be received and distributed, and perform preordering.

Steps 709 and 710: Return a red envelope or ticket.

Steps 711 to 715: Save information such as the red envelope or ticket returned after payment, request for a bill-checking ID, return the bill-checking ID, insert a merchant red envelope receiving journal, and the journal is successfully inserted.

Steps 716 to 720: Deliver a ticket message red envelope URL, insert an index, insertion of the index succeeds, push succeeds, and the sending succeeds.

A process of a time sequence of receiving a red envelope is shown in FIG. 11. A process in which a sharer of a ticket or a coupon exchanges information with a merchant and a back-end server includes the following steps:

Steps 801 to 803: Click a URL of H5, check the ownership and status of a red envelope, and return a red envelope or ticket.

Steps 804 to 807: Request for a package, and return the package.

Steps 808 to 810: Return a front-end template and package, call JSAPI and receive the red envelope, and the receiving succeeds. In this process, the calling JSAPI and receiving the red envelope is implemented by using an interface to be determined: for example, 1) interface of successful receiving call-back and 2) an interface of expired red envelope call-back.

By using the embodiments of the present disclosure, the problem that coupon receivers are not enthusiastic about coupon sharing is resolved, and the spread and promotion of coupons are facilitated. The embodiments of the present disclosure help a merchant to provide targeted marketing stimulation for the receiving and sharing behavior of a user.

Benefit between a receiver and a user is balanced in the life cycle of a coupon shared between friends.

Some words used in the accompanying drawings are explained as follows:

mp: a functional unit for public platform tickets;

mmbizcardrpmgr: a unit configured to detect whether a merchant payment business account is bound to a red envelope function;

mmbizpassbook: a red envelope management unit;

mmbizpassbookevent: a ticket-event asynchronous processing unit;

mmbizcardrpagent: a proxy unit interfacing with payment in a red envelope management module;

mmbizcardmsgcenter: a ticket & red envelope push unit;

billchecker: a bill-checking unit:

cardflowrecord: a self-detection unit configured to interface with a merchant;

sharer index: a page management unit on a sharing side H5;

mallwap: a journal storage unit; and mmbizcardrp: a unit interfacing with payment in the red envelope management module.

An embodiment of the present disclosure further provides a computer storage medium, the computer storage medium storing computer executable instructions, and the computer executable instructions being used for performing the foregoing information processing method.

In the several embodiments provided in this application, it is understood that the disclosed device and method may be implemented in other manners. The described device embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the composition parts may be implemented by using some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, all functional units in the embodiments of the present disclosure may be integrated into one processing unit, or each functional unit serves as one unit, or two or more than two units are integrated into one unit. The foregoing integrated units not only may be implemented in a form of hardware, but also may be implemented in a form of hardware plus a software functional unit.

A person of ordinary skill in the technology may understand that all or some of the steps of the method embodiments may be implemented by a program instructing relevant hardware. The program may be stored in a computer-readable storage medium. When the program is executed, the steps of the method embodiments are performed. The foregoing storage medium includes any medium that can store program code, such as a mobile storage device, a read-only memory (ROM), a random access memory (RAM), a magnetic disk, or an optical disc.

Alternatively, when the integrated unit in the present disclosure is implemented in the form of a software functional unit and sold or used as an independent product, the integrated unit may be stored in a computer-readable storage medium. Based on such an understanding, the technical solutions of the embodiments of the present disclosure, or the part contributing to the related technology may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a mobile storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the technology within the technical scope disclosed in the present disclosure shall fall within the protection scope of the present disclosure. Therefore, the protection scope of the present disclosure shall be subject to the protection scope of the claims.

INDUSTRIAL APPLICABILITY

According to the embodiments of the present disclosure, the at least one piece of recommended coupon information corresponding to the electronic coupon information is recommended and shared, according to the recommendation and sharing policy associated with the electronic coupon information, to the at least one second user that is in the friend list of the first user and logs into the second terminal; and the at least one virtual article is sent to the account of the first user when it is detected that the at least one second user logging into the second terminal redeems the recommended coupon information and according to the payment policy associated with the recommended coupon information, so that after a user uses received electronic coupon information, information indicating that the electronic coupon information is used is pushed to the user, and a feedback and a response are further provided for the consuming behavior of the user, so as to obtain a virtual article. Higher processing efficiency and a higher response speed can be achieved by means of such information sharing.

What is claimed is:

1. An information processing method of a back-end server, the method comprising:
    receiving a sharing request to share electronic information from a first terminal of a first user, the sharing request identifying a second user associated with the first user;
    sending, by circuitry of the back-end server, the electronic information to a second terminal of the second user, the second user being identified in the sharing request;
    receiving, by the circuitry of the back-end server, an asynchronous request responsive to the electronic information sent to the second terminal being used by the second user;
    obtaining identification information, included in the asynchronous request, for identifying the first user;
    obtaining indication information, included in the asynchronous request, for performing a function based on the electronic information;
    determining, according to the indication information, that the second user has performed the function;
    generating a virtual reward page based on a virtual reward template stored in the back-end server;
    sending, by the circuitry of the back-end server, a virtual reward notification message to the first terminal of the first user identified by the identification information in response to the received asynchronous request indicating that the electronic information sent to the second terminal is used by the second user, the virtual reward notification message including a link to the virtual reward page; and
    sending, by the circuitry of the back-end server, the virtual reward page in response to the link in the virtual reward notification message being selected by the first user, the virtual reward page being configured to display a virtual reward associated with the electronic information.

2. The method according to claim 1, wherein the asynchronous request includes a redemption request.

3. The method according to claim 1, further comprising: processing the virtual reward in response to a user input to accept the virtual reward via the virtual reward page.

4. The method according to claim 1, wherein the electronic information includes a ticket for the second user to obtain an object related to the electronic information.

5. The method according to claim 1, wherein the virtual reward includes at least one virtual article.

6. An information processing method, comprising:
    sending, by circuitry of a first terminal, a sharing request to share electronic information with a second user of a second terminal to a back-end server, the sharing request identifying the second user associated with a first user, the electronic information being sent to the second terminal of the second user; and
    receiving, by the circuitry of the first terminal, a virtual reward notification message from the back-end server, the virtual reward notification message being sent to the first terminal of the first user in response to an asynchronous request that is received by the back-end server when the electronic information sent to the second terminal is used by the second user, the asynchronous request including (i) identification information for identifying the first user and (ii) indication information for performing a function based on the electronic information, the second user being determined to have performed the function based on the indication information, and the virtual reward notification message being generated based on a virtual reward template stored in the back-end server and including a link to a virtual reward page;
    displaying the virtual reward notification message; and
    displaying, by the circuitry of the first terminal, the virtual reward page that is sent by the back-end server in response to the link in the virtual reward notification message being selected by the first user, the virtual reward page being configured to display a virtual reward associated with the electronic information.

7. The method according to claim 6, wherein the back-end server identifies the first user according to the identification information received when the electronic information is used by the second user, and sends the virtual reward notification message to the first terminal of the first user.

8. The method according to claim 6, wherein the back-end server determines that the second user has used the electronic information when the second user performs a function based on the electronic information.

9. The method according to claim 6, further comprising: receiving a user selection of an interactive object associated with the link via a touch screen interface, wherein the virtual reward page is sent by the back-end server in response to the user selection of the interactive object.

10. The method according to claim 9, wherein the interactive object is a graphical item that links to the virtual reward page.

11. The method according to claim 6, wherein the electronic information includes a ticket for the second user to obtain an item related to the electronic information.

12. The method according to claim 6, wherein the virtual reward includes at least one virtual article.

13. A back-end server, comprising:
circuitry configured to receive a sharing request to share electronic information from a first terminal of a first user, the sharing request identifying a second user associated with the first user;
send the electronic information to a second terminal of the second user, the second user being identified in the sharing request;
receive an asynchronous request responsive to the electronic information sent to the second terminal being used by the second user;
obtain identification information, included in the asynchronous request, for identifying the first user;
obtain indication information, included in the asynchronous request, for performing a function based on the electronic information;
determine, according to the indication information, that the second user has performed the function;
generate a virtual reward page based on a virtual reward template stored in the back-end server;
send a virtual reward notification message to the first terminal of the first user identified by the identification information in response to the received asynchronous request indicating that the electronic information sent to the second terminal is used by the second user, the virtual reward notification message including a link to the virtual reward page; and
send the virtual reward page in response to the link in the virtual reward notification message being selected by the first user, the virtual reward page being configured to display a virtual reward associated with the electronic information.

14. The back-end server according to claim 13, wherein the asynchronous request includes a redemption request.

15. The back-end server according to claim 13, wherein the circuitry is further configured to
process the virtual reward in response to a user input to accept the virtual reward via the virtual reward page.

16. The back-end server according to claim 13, wherein the electronic information includes a ticket for the second user to obtain an item related to the electronic information.

17. The back-end server according to claim 13, wherein the virtual reward includes at least one virtual article.

18. A non-transitory computer-readable storage medium storing computer executable instructions which when executed by a computer cause the computer to perform the information processing method according to claim 1.

19. A non-transitory computer-readable storage medium storing computer executable instructions which when executed by a computer cause the computer to perform the information processing method according to claim 6.

* * * * *